United States Patent
Turner

[11] 3,870,988
[45] Mar. 11, 1975

[54] HYBRID CARRIER BEAM SONAR
[75] Inventor: William R. Turner, Rockville, Md.
[73] Assignee: Automation Industries, Inc., New York, N.Y.
[22] Filed: Jan. 14, 1969
[21] Appl. No.: 791,882

[52] U.S. Cl. .............................. 340/3 R, 340/3 FM
[51] Int. Cl. ................................................ G01s 9/66
[58] Field of Search .......... 340/1, 3, 3 D, 5, 6, 1 R, 340/3 FM, 3 R, 5 R, 6 R; 343/18, 18 B, 18 D; 181/.5, .5 A, .5 B

[56] References Cited
UNITED STATES PATENTS

| | | | |
|---|---|---|---|
| 2,581,780 | 1/1952 | Ahier et al. | 340/3 D |
| 3,028,578 | 4/1962 | Stanton | 340/1 |
| 3,153,236 | 10/1964 | Rines | 340/5 X |
| 3,215,944 | 11/1965 | Matthews | 181/0.5 X |

*Primary Examiner*—Richard A. Farley
*Attorney, Agent, or Firm*—Jones, Tullar & Cooper

[57] ABSTRACT

An underwater detection and identification method and apparatus utilizing the principle of parametric cross-modulation of ultrasonic frequencies within a non-linear propagation medium for obtaining an acoustical signature of an object under observation. The object is illuminated by ultrasound of suitable, high frequency projected from the observation platform and echo signals are received composed of side bands generated by combining the illuminating frequency with the relatively low signature frequency. The received ultrasonic side band frequency signals are then processed electronically to yield a signal representative of a characteristic of the object. The apparatus is essentially a hybrid, active-passive sonar operating in a continuous uninterrupted mode.

10 Claims, 5 Drawing Figures

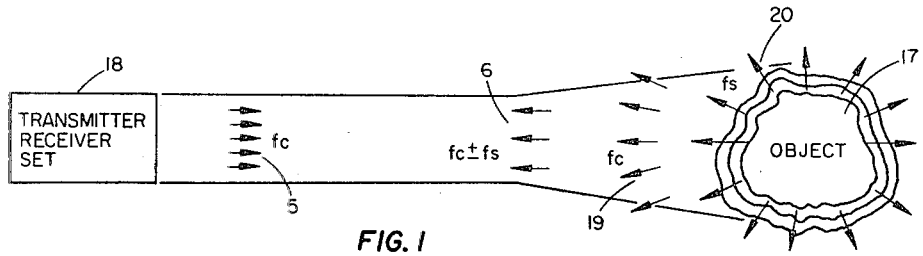
FIG. 1
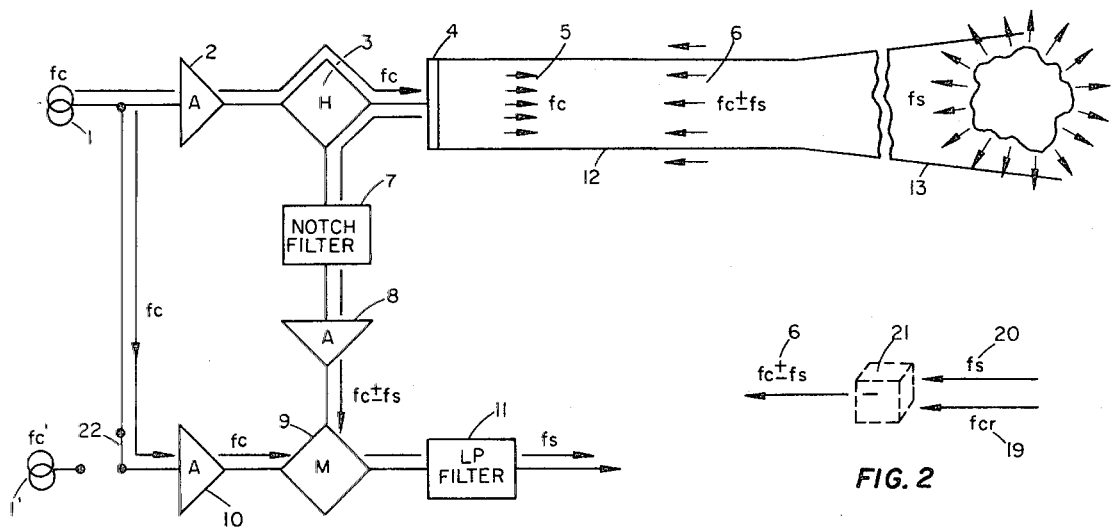
FIG. 4
FIG. 2
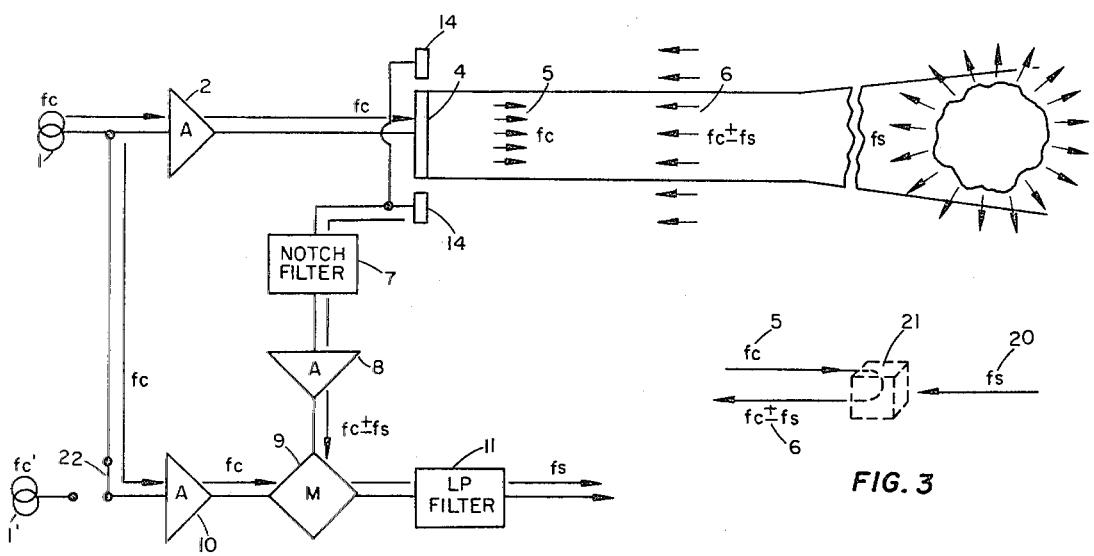
FIG. 5
FIG. 3
INVENTOR
WILLIAM R. TURNER
By
ATTORNEY

HYBRID CARRIER BEAM SONAR

This invention pertains to underwater detection and identification of objects through ultrasonic and electronic instrumentalities which generate improved reception of the signature of the object under investigation. Broadly speaking, the method involved falls between active and passive sonar; the object is illuminated by a high frequency beam to produce an echo which, unlike conventional sonar, is of a frequency different from that of illuminating beam and which is formed by cross-modulation of the beam frequency with the signature frequency generated by the object. In effect, the illuminating beam echo acts as a carrier for the signature of the object. Unlike conventional, active sonar, the observation may be substantially continuous rather than intermittent as the echo signal is not cancelled out by the transmitted illuminating signal. Illuminating ultrasound is projected towards the object continuously rather than by discrete pings, and the echo of cross-modulated side band frequency is received on a continual basis for electronic processing which yields the signature of the object.

The principle of parametric cross-modulation of ultrasonic signals within a non-linear compressibility propagation medium, such as sea water, and some particular applications thereof to imaging tube operation at relatively short range have been described in applicant's co-pending U.S. Pat., application, Ser. No. 607,946, now U.S. Pat. No. 3,510,833. The present utilization of the same principle relates to acoustical long range signature detection and, as will be obvious from the description that follows, differs from the prior invention in important aspects of ultrasound geometry and the electronic signal processing instrumentation.

The principal object of this invention is to provide an improved method and apparatus for identification of objects having distinctive sonic signatures.

More specifically, it is the object to obtain identification of an object having a relatively weak, low frequency, sonic signature by projecting high frequency ultrasound illumination towards it and by accepting echo signals of side band frequencies generated by parametric cross-modulation of illuminating frequency and signature frequency. The received side band signal is then processed electronically to obtain the signature data.

A further object of this invention is to utilize a continuously acting (non-intermittent) sonar transmitter - receiver set capable of detecting low frequency sound associated with an object in an ultrasound transmitting medium.

A further and most important object of this invention is to provide an apparatus for performing the above functions which is of significantly smaller dimensions than existing signature detecting sonars, and yet of a range comparable to or beyond that attainable heretofore by very elaborate sonar arrays.

With the above and related objects in mind, the invention will now be described in connection with the following figures.

FIGS. 1, 2, and 3 are schematic illustrations of the principle of operation.

FIG. 4 represents a combined electronic and ultrasonic block diagram of one preferred embodiment.

FIG. 5 shows another embodiment in electronic-ultrasonic block form.

Referring to FIG. 1, 18 is a transmitter/receiver set submerged in an ultrasonic transmission medium (sea water), and 17 is the object in the same medium, emitting characteristic low frequency, generally low amplitude sound waves 20 (fs), which it is desired to identify. A high frequency ultrasound carrier beam 5 (fc) is projected from set 18 towards the object to illuminate same and to produce a reflected scattered echo of the same frequency as the illuminating beam. This is the essential geometry of a conventional active sonar system in which the projected ultrasonic signal is normally pulse of frequency modulated, and the elapsed time of transit is utilized to determine range. In general, the reflected sonar signal 19 (fcr) will not give the sensor a direct identification of object 17 and will not take into account the characteristic sonic signature (fs) thereof.

Many artifacts besides targets of military interest will return almost indistinguishable echoes when impinged by an active sonar beam; among such artifacts are schools of fish, mammals, ship wakes, surface waves, bubbles and other discontinuities. It is the primary characteristic of this invention that it takes cognizance of and permits delineation of the characteristic signature sound 20 (fs) present in most targets of military interest as distinct from artifacts echoes. This is accomplished by sensing at the receiver the side bands 6 (fc ± fs) of the ultrasonic carrier returning to the sensor rather than the echo of the carrier itself. These side bands will be generated in the transmission path between the object and the sensor which path may be considered as comprised of a multiplicity of discrete volume elements. One such is shown at 21 in FIG. 2, where it has impressed upon it the reflected carrier waves 19 (fcr), and the object emitted low frequency waves 20 (fs). By reason of the non-linear compressibility of the liquid transmission medium, this volume element will pulsate not only at the frequencies of the impressed signals, but also at the sum and difference frequencies, producing the side band signals 6 (fc ± fs). The compressibility of the liquid transmission medium can be expressed as an expansion, $$\eta = \eta_0 + \eta_1 (p - p_0) + \qquad (1)$$

where $\eta_0$ is the zero-order or linear compressibility term, and $\eta_1$, the first-order and the most significant non-linear term, and $(p - p_0)$, the incremental change in pressure. The pressure amplitude $P_{sb}$ of each side band component at a distance $h$ from the volume element in ratio to the low frequency signal pressure amplitude, $P_s$, incident upon the element, is given by, $$P_{sb}/P_s = \rho V_o \omega_{sb}^2 / 4\pi h \eta_1 P_c \epsilon^{-\alpha h} \qquad (2)$$

where $\rho$ is transmission medium density, $V_o$ element volume, $\omega_{sb}$ the circular frequency of the side band component, $P_c$ the pressure amplitude of the carrier signal incident upon the element, and $\alpha$ the attenuation constant for the carrier and its side bands. (The attenuation of the low frequency signal is assumed to be small compared to the carrier.) Side band radiation will arise only from volume elements upon which are incident both the carrier signal 19 and the low frequency signal 20. Additionally, the receiving directivity of the sensor will further limit the volume from which side band energy is received. The net volume can be described as the "effective interaction volume."

If the volume element 21 is dimensionally small compared to the wave length of a particular side band component, the radiation of this component will be uniform in all directions. However, for an extended interaction volume, dimensionally large compared to the wave length, accumulative reinforcement of the side band signals will occur along an axis between the sensor and the object through the summing of the cross-modulation pressures radiated from each volume element within the effective interaction volume. Reception of the carrier side bands will be highly directional as a result of 1 - the directivity possible for the high frequency carrier beam sensor and the resultant defining of the effective interaction volume, and 2 - the accumulative reinforcement of the side band signals along the axis between the sensor and the object. The cross-modulation effect will occur in pure water because all liquids and gases exhibit a degree of non-linear compressibility. However, the effect will be greatly enhanced by the presence of air cavities such as microbubbles and the swim bladders of marine life which are characteristic of the ocean. For instance, the first order (non-linear) compressibility of pure water is approximately $-5.3 \times 10^{-19}$ m$^4$/Newton$^2$, but is increased to $-5.0 \times 10^{-17}$ m$^4$/Newton$^2$ by the presence of only one part per million of free gas in the water in the form of bubbles or other air pockets.

If a relative motion exists between the sensor and the object, the scattered carrier 19 will be shifted in frequency by Doppler. For a decreasing spacing between the sensor and the object, the scattered carrier will be increased in frequency, whereas for an increasing spacing, the scattered carrier will be reduced in frequency. A similar Doppler frequency shift will occur for the carrier side bands since they are referenced by cross-modulation to the scattered carrier frequency.

At ranges for which the high frequency carrier 5 is greatly attenuated upon being scattered by the object so that detectable echo carrier cannot reach the sensor, detectable side bands may, nevertheless, be generated through the following alternate mechanism. Any carrier signal reflected in the direction of the sensor by discrete scatterers (other than the object of interest) along the path between the sensor and the object will cross-modulate with low frequency object emission to form side bands in the same manner as if the carrier had been scattered by the object itself. Such discrete scatterers in the ocean include the swim bladders of marine life, air cavities, and similar discontinuities which produce an observable back scatter of sound under almost all ocean water conditions.

In the absence of discrete scatterers, opposing direction cross-modulation will occur, as shown in FIG. 3. This can be differentiated from the conversion mode illustrated in FIG. 2 by noting that in FIG. 2 the carrier reflection 19 (fc) propagates in the same direction as the low frequency signal 20 (fs), whereas in FIG. 3, the carrier 5 (fc) propagates away from the sensor and in the opposite direction from that of the low frequency signal 20 (fs).

The relative strengths of the side band signals returning to the sensor in each case depend upon the manner in which the sidebands radiated by discrete volume elements throughout the interaction volume are summed at the sensor. With reference to FIG. 2, a low frequency signal arriving along the sensor axis produces side band components from substantially all of the interaction zone which are in phase and hence additive at the sensor. With reference to FIG. 3, the folded back nature of the carrier produces side band components that rotate in phase by two full circles for each additional carrier wave length distance from the sensor to a specific volume element. If the received side band signals were uniform from all points of the interaction volume, this phase rotation would produce total cancellation of the side band signals returned to the sensor. This does not occur, however, because the received side band signal is not constant from all points of the interaction volume, but varies in a regular manner due to the attenuation and spreading with distance of the carrier, and in an irregular manner due to varying populations of microbubbles which affect the strength of the non-linear parameter.

In summary, by sensing the carrier side bands instead of the scattered carrier itself, objects emitting low frequency sound can be discriminated from artifacts that scatter the carrier, but do not emit low frequency sound. At ranges beyond which direct carrier reflection by the object is significant, detection of the low frequency signal remains possible by side band formation against carrier back scattered from discrete scatterers in the ocean or by opposing direction conversion. Although the conversion loss in these alternate modes of operation is larger, noise reception in a typical underwater configuration will be low because noise will be reduced in magnitude by the same conversion factor as applies to the signal, and additionally, the noise, being omnidirectional in character, will be further reduced by the high directivity of the sensor. The ultimate sensitivity limit, thus, will be the internal noise of the sensor.

Having explained the principle of operation, an operative embodiment will now be presented in connection with FIG. 4 where oscillator 1 generates the carrier frequency $f_c$, which is applied to power amplifier 2 and transmitted through the hybrid bridge circuit 3 to the electroacoustic conversion plate 4 to produce the ultrasonic carrier beam 5 which is radiated into an ultrasonic transmission medium. By non-linear interactions described above, the carrier side bands 6 (fc ± fs), where fs is the lower frequency to be detected, are scattered back toward the sensor where they are converted into electrical signals by plate 4, and are diverted by the hybrid bridge circuit 3 to the notch filter 7, which is tuned to the carrier frequency $f_c$ and has the purpose of removing any residual carrier not balanced out by the hybrid bridge so that the residual carrier will not overload the low noise preamplifier 8. Finally, the carrier side band components are applied to modulator 9 which also receives the carrier signal through buffer amplifier 10, producing the original low frequency signal $f_s$ after the higher order modulation components are removed by low pass filter 11. This signal can then be applied to further conventional processing steps such as spectrum analysis. The transmission and reception properties of the sensor are established by the carrier frequency, the conversion plate area, and the conversion plate shape. In general, for a flat plate, they are characterized by a "near-field" diffraction zone 12 in which the energy will be collimated as a beam, and a "far-field" diffraction zone 13, in which spherical spreading will occur. A third characteristic will be the rate of ultrasonic absorption. This will increase, generally, as a square function of the frequency. The positioning of the near-field/far-field transition with relation to the distance required for ultrasonic energy extinction are parameters that will affect the directivity of the sensor.

The usefulness of a combined transmitter/receiver sensor may be limited in some application by the inherent dissipation of one-half of the carrier power in the hybrid bridge circuit, and a relatively low signal-to-noise ratio therein. Additionally, for some applications it will be detrimental that the strongest region of non-linear interaction will occur immediately in front of the conversion plate of the combined transmitter/receiver.

An alternative configuration avoiding these possible drawbacks is shown in FIG. 5, where separate transmitting transducer 4' and receiving transducers 14 are utilized. The hybrid bridge circuit is no longer needed. Consequently, all of the transmitting power developed by amplifier 2 is applied to the electroacoustic conversion plate 4'. The separate receiver 14 may comprise one or more discrete elements, or a concentric ring as shown here. Further, for some applications it may be advantageous to interchange the transmitting and receiving elements. Other sections of the system perform as has been described for FIG. 4.

In separating the transmitting and receiving functions, a significant factor must be recognized: The near-field volumes occupied by the transmitting and the receiving beams may not coincide. Thus, useful interaction between the carrier beam and an approaching disturbance may produce receivable side bands only from far-field regions. In some instances this design parameter can be beneficially manipulated to assure that the interaction zone is beyond regions of local turbulence.

In the event Doppler effect is involved in the course of observation, an alternative variable generator 1' is utilized to generate frequency fc' corresponding to Doppler shifted carrier frequency, which latter is transmitted to amplifier 10. A switch 22 is provided as shown in FIGS. 4 and 5 to cut in either generator 1 or 1'. It will be obvious that Doppler shift of carrier frequency will not affect formation of the side bands accepted by the sensor, and that transmission of fc' to modulator 9 will cancel the Doppler effect.

In both embodiments described above, the signal emerging from amplifier 8 is fc ± fs (assuming absence of Doppler). At modulation 9 this signal is combined with fc from amplifier 10 to give the following:

$$a - (fc + fs) + fc = 2fc + fs$$
$$b - (fc + fs) - fc = + fs$$
$$c - (fc - fs) + fc = 2fc - fs$$
$$d - (fc - fs) - fc = - fs = + fs$$

2fc + fs and 2fc − fs are filtered out by LP filter 11 producing a system output of fs which is processed to further conventional analysis and/or display devices.

The manner of application is not limited to the specific examples set forth above. Other configurations will become obvious as specific applications are studied in the light of the present teaching.

I claim:

1. The method of ultrasonic detection and identification of objects having distinctive sonic signatures in a liquid propagation medium comprising the steps of a. projecting high frequency ultrasound illumination towards the object;
  b. obtaining reflected scatter of the same frequency;
  c. cross-modulating the scatter signal with the signature signal of the object within the propagation medium to generate side band frequencies;
  d. receiving the side band frequencies and;
  e. processing said received side band frequencies to eliminate the initial illuminating frequency and to obtain the signature of the object.

2. The method of claim 1, wherein the reflected scatter is obtained from the object to be identified, and wherein the cross-modulation occurs in a zone intermediate a sensor for receiving the side bands, and the object.

3. The method as in claim 1, wherein the reflected scatter is obtained from discontinuities present within the propagation medium intermediate a sensor and the object, and wherein the signature signal of the object is cross-modulated with such scatter.

4. The method as in claim 1, wherein the ultrasound illumination and side band reception and processing proceed in a continuous, non-intermittent mode.

5. A hybrid active-passive sonar for accepting the low frequency sonic signature of an object comprising a transmitter for beaming a relatively high illuminating frequency (fc) towards said object and obtaining reflected scatter of same frequency, means operating within the sonar transmitting medium for cross-modulating the scatter signal (fc) with the signal frequency characteristic of the object (fs) to obtain side band frequencies (fc ± fs) of said illuminating frequency, a receiver for accepting said side band frequencies and processing means for canceling the illuminating frequency from said received side bands to yield a signal of frequency (fs) comprising the signature of the object to be identified, whereby the illuminating frequency (fc) serves as a carrier for the signature frequency (fs).

6. A system according to claim 5 wherein the illuminating frequency is beamed continually and the side band frequencies are likewise received continually without mutual interference to permit uninterrupted observation of the object, independently of the time of signal transit.

7. A system according to claim 5 wherein the reflected scatter is formed by the object under observation.

8. A system according to claim 5 wherein the processing means comprises a modulator component which mixes the received side band frequencies (fc ± fs) with the illuminating frequency (fc), and a low pass filter which suppresses all but the signature signal of frequency (fs).

9. A system according to claim 8 wherein the signal source of frequency (fc) for the modulator is the same signal generating means which supplies illuminating signal power to the transmitter.

10. A system according to claim 9 wherein further variable frequency signal generating means is provided for transmitting Doppler modified frequencies of (fc) to the modulator, when Doppler effect is involved in an observation, and wherein switching means is provided to selectivity cut in one of said generating means.

* * * * *